United States Patent
Barus et al.

(10) Patent No.: US 9,742,198 B2
(45) Date of Patent: *Aug. 22, 2017

(54) CONTROLLING A FAULT-TOLERANT ARRAY OF CONVERTERS

(71) Applicant: International Business Machines Corporation, Armonk, NY (US)

(72) Inventors: Daniel J. Barus, Poughkeepsie, NY (US); Kevin R. Covi, Glenford, NY (US); William P. Kostenko, Poughkeepsie, NY (US); Jack P. Lee, Poughkeepsie, NY (US); Peter A. Wendling, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,116

(22) Filed: Mar. 28, 2016

(65) Prior Publication Data

US 2016/0211674 A1    Jul. 21, 2016

Related U.S. Application Data

(63) Continuation of application No. 13/592,553, filed on Aug. 23, 2012, now Pat. No. 9,298,241, which is a
(Continued)

(51) Int. Cl.
*H02J 5/00*      (2016.01)
*G06F 1/28*      (2006.01)
(Continued)

(52) U.S. Cl.
CPC ........... *H02J 5/00* (2013.01); *G06F 1/263* (2013.01); *G06F 1/28* (2013.01); *G06F 1/305* (2013.01); *Y10T 307/50* (2015.04); *Y10T 307/62* (2015.04)

(58) Field of Classification Search
CPC ...................................................... H02J 3/00
(Continued)

(56) References Cited

U.S. PATENT DOCUMENTS 4,281,376 A    7/1981   Munchow et al.
6,836,100 B2   12/2004  Egan et al.
(Continued)

FOREIGN PATENT DOCUMENTS

CN    102075097    5/2011
CN    102447299    5/2012

OTHER PUBLICATIONS

"U.S. Appl. No. 13/592,553 Office Action", Jul. 2, 2015, 5 pages.
(Continued)

*Primary Examiner* — Robert Deberadinis
(74) *Attorney, Agent, or Firm* — DeLizio Law, PLLC

(57) ABSTRACT

A redundant path power subsystem comprises a plurality of phase regulators in a multi-phase power converter. The plurality of phase regulators comprises at least N+2 phase regulators. N phases are sufficient to serve an electrical load coupled with the redundant path power subsystem. The redundant path power subsystem also comprises a plurality of power supplies, and a plurality of input and control paths between the plurality of power supplies and the plurality of phase regulators. The plurality of input and control paths comprises a plurality of multiplexing logic devices and a plurality of phase controllers. The plurality of phase controllers is configured to control the plurality of phase regulators. The plurality of multiplexing logic devices is configured to multiplex control signals from the plurality of power supplies and a microprocessor for the plurality of phase controllers.

17 Claims, 4 Drawing Sheets

Related U.S. Application Data continuation of application No. 13/492,403, filed on Jun. 8, 2012, now Pat. No. 9,030,047.

(51) Int. Cl.
*G06F 1/26* (2006.01)
*G06F 1/30* (2006.01)
*H02J 3/00* (2006.01)

(58) Field of Classification Search
USPC .......................................................... 307/65
See application file for complete search history.

(56) References Cited

U.S. PATENT DOCUMENTS

| | | | |
|---|---|---|---|
| 6,894,463 | B2 | 5/2005 | Kernahan |
| 7,365,661 | B2 | 4/2008 | Thomas |
| 7,373,527 | B2 | 5/2008 | Chapuis |
| 7,518,894 | B2 | 4/2009 | Fosler et al. |
| 7,730,332 | B1 | 6/2010 | Templeton |
| 7,908,402 | B2 | 3/2011 | Fernald et al. |
| 9,298,241 | B2 * | 3/2016 | Barus ................ G06F 1/28 |
| 2004/0095118 | A1 | 5/2004 | Kernahan |
| 2006/0172783 | A1 | 8/2006 | Leung et al. |
| 2009/0152949 | A1 | 6/2009 | Adragna et al. |
| 2010/0013307 | A1 | 1/2010 | Heineman et al. |
| 2010/0201405 | A1 | 8/2010 | Ahmad |
| 2011/0154085 | A1 | 6/2011 | Rickard |
| 2011/0191618 | A1 | 8/2011 | Berke et al. |

OTHER PUBLICATIONS

Kollman, et al., "Processor Power Subsystem Architectures", Proceedings of IEEE, 2000, 1183-1189.

Lee, et al., "Topologies and Design Considerations for Distributed Power System Applications", Proceedings of the IEEE, vol. 89, No. 6, Jun. 2001, 939-950.

Panov, et al., "Stability and Dynamic Performance of Current-Sharing Control for ParalleledVoltage Regulator Modules", IEEE Transactions on Power Electronics, vol. 17, No. 2, Mar. 2002, 172-179.

Sahu, "Analysis and Design of a Fully-Integrated Current Sharing Scheme for Multi-Phase Adaptive on-Time Modulated Switching Regulators", Power Electronics Specialists Conference, 2008. PESC 2008. IEEE, Jun. 2008, 3829-3835.

Yongqing, "Phase regulation technology for standard power source", Electrical Measurement & Instrumentation; vol. 38, No. 426, Jun. 30, 2001, pp. 46-47.

Zhang, et al., "Current Sharing in Digitally Controlled Masterless Multi-Phase DC-DC Converters", Power Electronics Specialists Conference, 2005. PESC '05. IEEE 36th, Jun. 2005, 7 pages.

Zhang et al., "Investigation of VRM controllers", Proceedings of 2004 International Symposium on Power Semiconductor Devices & ICs, Kitakyushu, 2004, 51-54.

* cited by examiner

CONTROLLING A FAULT-TOLERANT ARRAY OF CONVERTERS

RELATED APPLICATIONS

This application is a continuation of U.S. patent application Ser. No. 13/592,553, filed Aug. 23, 2012, now U.S. Pat. No. 9,298,241, which is a continuation of U.S. patent application Ser. No. 13/492,403 filed Jun. 8, 2012, which issued as U.S. Pat. No. 9,030,047.

BACKGROUND

Embodiments of the inventive subject matter generally relate to the field of power systems, and, more particularly, to controlling a fault-tolerant array of converters in a high availability system.

High availability power systems for microprocessors include components for power conversion, controls, diagnostics and communication in a single package which can be utilized in a redundant arrangement. However, to attain high availability, a redundant control and monitoring system is also utilized to monitor status, provide communication between various elements of the power system, and detect failures for maintenance purposes. Conventional systems utilize extra phase regulators (e.g., buck regulators) to implement redundancy at phase level in a multi-phase regulator arrangement. A phase regulator is isolated from other phases using protection circuitry. On failure of a certain phase regulator, one of the extra phase regulators serves the role of the failed phase regulator.

SUMMARY

Embodiments of the inventive subject matter include a redundant path power subsystem. The redundant path power subsystem comprises a plurality of phase regulators in a multi-phase power converter. The plurality of phase regulators comprises at least N+2 phase regulators. N phases are sufficient to serve an electrical load coupled with the redundant path power subsystem. The redundant path power subsystem also comprises a plurality of power supplies, and a plurality of input and control paths between the plurality of power supplies and the plurality of phase regulators. The plurality of input and control paths comprises a plurality of multiplexing logic devices and a plurality of phase controllers. The plurality of phase controllers is configured to control the plurality of phase regulators. The plurality of multiplexing logic devices is configured to multiplex control signals from the plurality of power supplies and a microprocessor for the plurality of phase controllers.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to a Serial Peripheral Interface (SPI) bus for communication between a multiplexing logic device and a microprocessor, embodiments are not so limited. Embodiments can use a Serial Input/Output eXchange (SIOX) bus, a Controller Area Network (CAN) bus, etc., for communication between a multiplexing logic device and a microprocessor. Embodiments are also not limited to utilizing an Inter-Integrated Circuit (I2C) bus for communication between a multiplexing logic and a power supply. Embodiments can utilize a System Management Bus (SMBus), a Power Management Bus (PMBus), etc., for communication between the multiplexing logic and the power supply. In other instances, well-known instruction instances, protocols, structures and techniques have not been shown in detail in order not to obfuscate the description.

A microprocessor power management subsystem with redundant paths of input and control between the power supplies and a multi-phase power converter (hereinafter referred to as "redundant path power subsystem") overcomes a single point of failure presented by a microprocessor power management subsystem utilizing a common multi-phase controller (e.g., single multi-phase controller). Instead of a single phase controller controlling multiple or all phases of the multi-phase power converter, a phase controller controls each phase of the multi-phase power converter in the redundant path power subsystem. The redundant paths of input and control include redundant phase controllers and multiple multiplexing logic devices.

Figure 1:
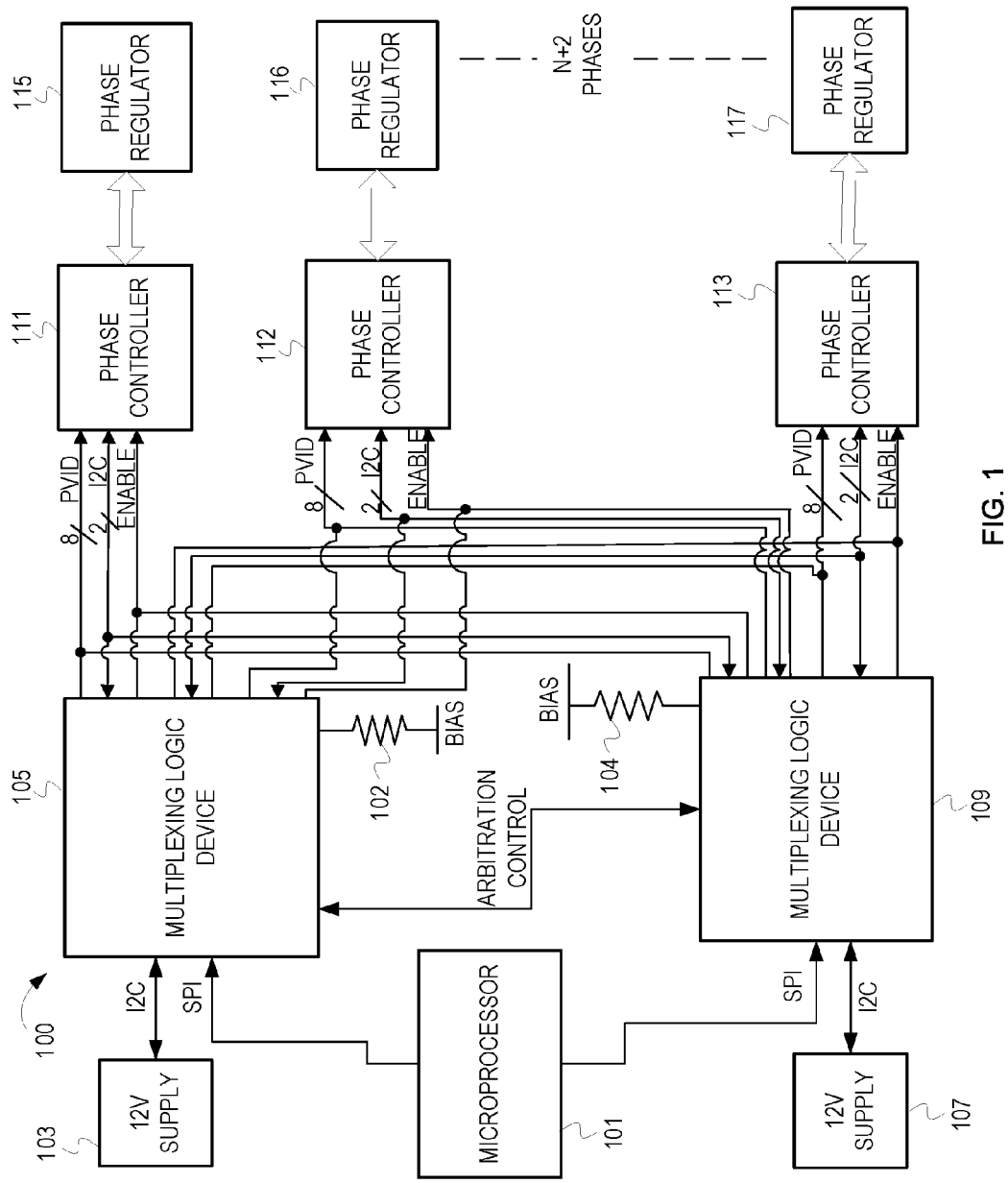
FIG. 1 depicts a conceptual diagram of selected components of a redundant path power subsystem for a high availability system.

FIG. 1 depicts a conceptual diagram of selected components of a redundant path power subsystem for a high availability system. FIG. 1 depicts a redundant path power subsystem 100 including a power supply 103, a power supply 107, a microprocessor 101, a multiplexing logic device 105, a fusible resistor 102, a multiplexing logic device 109, a fusible resistor 104, a phase controller 111, a phase regulator 115, a phase controller 113, a phase regulator 117, a phase controller 112 and a phase regulator 116. The redundant path power subsystem 100 includes an array of N+2 phase regulators in parallel for an electrical load, where N phases are sufficient to serve the electrical load. With a sufficiently low failure rate per phase, the probability of more than two phases failing is effectively zero. The phase regulator 115, the phase regulator 116 and the phase regulator 117 illustrate three of the N+2 phase regulators in the redundant path power subsystem 100. Each phase regulator in the array is coupled with a phase controller (e.g., voltage regulator module (VRM) controller) to receive control signals (e.g., voltage reference, current control, clock, etc.). The phase controller 111, the phase controller 112 and the phase controller 113 illustrate three of the N+2 phase controllers in the redundant path power subsystem 100.

The power supply 103 and the power supply 107 depict two hot-swappable power supplies. This redundant path power subsystem 100 is implemented with the power supplies 103 and 107 for redundancy. Each of the 12 volt power supplies 103 and 107 include a power management processor (e.g., Flexible Server Processor) to monitor diagnostics information received over a bi-directional I2C bus. The power supplies 103 and 107 are respectively coupled to the multiplexing logic devices 105 and 109 using the bi-directional I2C bus. The power supplies 103 and 107 utilize the bi-directional I2C bus to receive diagnostics information (e.g., status of a phase controller, current values, etc.). The bi-directional I2C is also used to send control signals (e.g., turn-on, turn-off, etc.) to the N+2 phase controllers. In some embodiments, the power supplies 103 and 107 are interfaced with the multiplexing logic devices 105 and 109 via a Power Management Bus.

The microprocessor 101 represents the microprocessor powered by the redundant path power subsystem 100. The microprocessor 101 can be any of the industry standard microprocessors (e.g., a 32 bit microprocessor, a 64 bit microprocessor, etc.). The microprocessor 101 sends voltage control signals to the N+2 phase controllers using Parallel Voltage Identification (PVID) bits. The microprocessor 101 is interfaced with the multiplexing logic devices 105 and 109 via a high-speed SPI bus. The power management processors in the power supplies 103 and 107 utilize the low-speed bi-directional I2C bus to poll the N+2 phase controllers for status. The microprocessor 101 can interrupt the polling operations via the high-speed SPI bus and virtual real-time voltage control for the phase controllers can be achieved.

The multiplexing logic device 105 multiplexes control signals for the N+2 phase controllers to be transmitted and received via a single bi-directional I2C bus from the power supply 103. The multiplexing logic device 105 also multiplexes control signals for the N+2 phase controllers to be received via a single SPI bus from the microprocessor 101. The multiplexing logic device 109 multiplexes control signals for the N+2 phase controllers for the power supply 107 and the microprocessor 101. The multiplexing logic device 105 and the multiplexing logic device 109 are interfaced with each of the N+2 phase controllers using 11 output pins (8 pins for PVID, 2 pins for the bi-directional I2C bus and 1 pin for an enable signal). The multiplexing logic device 105 and the multiplexing logic device 109 may be implemented using a programmable logic device (e.g., CPLD, FPGA, PAL, etc.). The multiplexing logic device 105 and the multiplexing logic device 109 may include two distinct sub-multiplexing logic devices for multiplexing the control signals to be transmitted via the SPI bus and via the bi-directional I2C bus. The multiplexing logic devices 105 and 109 include a bi-directional arbitration control interface to establish an arbitration control. In case of a failure at either of the multiplexing logic devices 105 or 109, the respective power supply 103 or 107 detects the failure and disables the failed multiplexing logic device. The arbitration control between the multiplexing logic devices 105 and 109 ensures that no control signals are transmitted via a failed multiplexing logic device. The multiplexing logic device 105 includes a fusible resistor 102 and the multiplexing logic device 109 includes a fusible resistor 104. The fusible resistors 102 and 104 are low resistance resistors which melt when excess current flows through them. The fusible resistors 102 and 104 limit fault currents in case of a failure at the respective multiplexing logic device. The output pins of the multiplexing logic device 105 and the multiplexing logic device 109 default to a high impedance state in case of a failure and the failure at one of the multiplexing logic devices does not affect the operations of the other multiplexing logic device. When a single output pin of either of the multiplexing logic devices 105 or 109 ceases to function, only the phase controller connected to the output pin is affected and the remaining N+1 phase controllers continue in normal operation. The multiplexing logic devices 105 and 109 provide a redundant communication path from the power supply 103, the power supply 107 and the microprocessor 101 to each of the N+2 phase controllers. The redundant communication path ensures that the multiplexing logic device 105 or the multiplexing logic device 109 is not a single point of failure in the high availability system.

Each of the N+2 phase controllers are coupled with the power supply 103, the power supply 107 and the microprocessor 101 via the multiplexing logic device 105 and the multiplexing logic device 109. For the purpose of simplifying the diagram, only the control interfaces for the phase controller 111 with the power supply 103, the power supply 107 and the microprocessor 101 are described. Similar control interfaces are utilized for the phase controller 112, the phase controller 113 and for each of the N+2 phase controllers in the redundant path power subsystem 100. The phase controller 111 includes an enable pin, two pins for the bi-directional I2C bus and 8 PVID pins at the input. The 11 pins of the phase controller 111 are directly connected with 11 pins of the multiplexing logic device 105 and also with 11 pins of the multiplexing logic device 109. The phase controller 111 receives voltage values in the form of 8 PVID bits and an enable signal to enable the operation of the phase controller 111. In the depicted embodiment, all the N+2 phase controllers are always enabled and the redundant path power subsystem 100 implements active redundancy. The phase controller 111 sends diagnostics information to the power supplies 103 and 107 via the bi-directional I2C bus. The phase controller 111 also receives an output feedback voltage and a detected current signal from the phase regulator 115. The phase controller 111 generates control signals to control the current at the output of the phase regulator 115. The N+2 phase regulators in the redundant path power subsystem 100 have equal currents at the output and share the load equally. The N+2 phase regulators deliver output current at a reduced capacity (less than full capacity). In an event of the failure, when one of the N+2 phase regulators is not utilized to deliver output current, the remaining N+1 phase regulators increase the current at output. The N+2 phase regulators also include protection circuitry to isolate each of the phase regulators from the other phase regulators. The phase controller 111 and the phase regulator 115 implement the Droop current-sharing method. The Droop current sharing method allows the regulated voltage at the phase regulator 115 to drop by a controlled amount as a function of current. The N+2 phase regulators in the redundant path power subsystem 100 operate independently, thereby avoiding the introduction of single points of failure. The redundant path power subsystem 100 can be implemented using phase controllers that support a serial control interface.

In the redundant path power subsystem 100, the N+2 phase controllers receive control signals from the power supplies 103 and 107 to synchronize the N+2 phase regulators to supply output current. Based on the control signals received from the power supplies 103 and 107, the N+2 phase controllers send control signals to the respective phase regulators. For example, a control signal from a phase controller indicates the time at which the phase regulator, coupled to the phase controller, delivers output current. The power supplies 103 and 107 send control signals to each of the N+2 phase controllers via the multiplexing logic devices 105 and 109. The multiplexing logic device 105 transmits control signals received from the power supply 103 to one of the N+2 phase controllers at a certain time via an I2C bus. The multiplexing logic device 109 transmits control signals received from the power supply 107 to one of the N+2 phase controllers at a certain time via an I2C bus. The arbitration control between the multiplexing logic devices 105 and 109 ensures that control signals from only one of the multiplexing logic devices 105 or 109 are transmitted to a phase controller at a certain time. In some implementations, the multiplexing logic devices 105 and 109 implement the arbitration control using a timed lockout mechanism. For example, each of the multiplexing logic devices 105 and 109 include a countdown timer, an enable input pin and an enable output pin. The enable input pin of the multiplexing logic device 105 is connected to the enable output pin of the multiplexing logic device 109 and vice-versa. When the enable input pin of the multiplexing logic device 105 is high it remains in a high-impedance state and output pins of the multiplexing logic device 105 are disabled. When the enable input pin of the multiplexing logic device 105 is high, the enable output pin of the multiplexing logic device 109 is high and control signals from the multiplexing logic device 109 are transmitted to phase controllers. The power supply 103 can set the countdown timer in the multiplexing logic devices 105, when the countdown timer is running the enable output pin of the multiplexing logic device 105 is high and all outputs of the multiplexing logic device 105 are enabled and active. Also, when the countdown timer in the multiplexing logic device 105 is running, the enable input pin of the multiplexing logic device 109 is high and the enable output pin of the multiplexing logic device 109 is low which locks out the multiplexing logic device 109.

Figure 2:
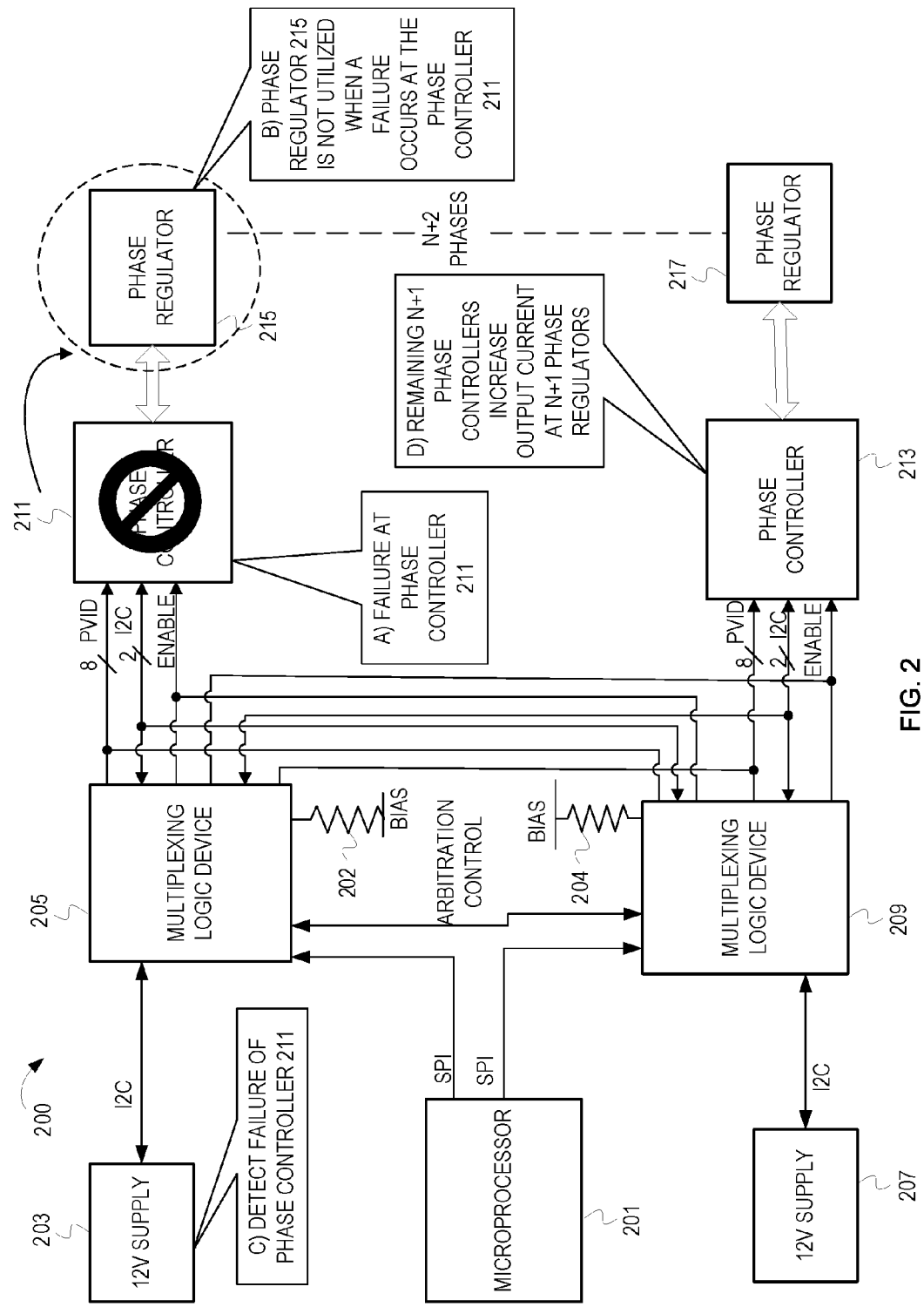
FIG. 2 depicts an example conceptual diagram of selected components of a redundant path power subsystem with a failure at one of the phase controllers.

FIG. 2 depicts an example conceptual diagram of selected components of a redundant path power subsystem with a failure at one of the phase controllers. FIG. 2 depicts a redundant path power subsystem 200 including a power supply 203, a power supply 207, a microprocessor 201, a multiplexing logic device 205, a fusible resistor 202, a multiplexing logic device 209, a fusible resistor 204, a phase controller 211, a phase regulator 215, a phase controller 213 and a phase regulator 217. The redundant path power subsystem 200 includes an array of N+2 phase regulators. With one phase controller for each phase regulator, the redundant path power subsystem 200 includes N+2 phase controllers. The phase regulator 215 and the phase regulator 217 illustrate two of the N+2 phase regulators in the redundant path power subsystem 200. The phase controller 211 and the phase controller 213 illustrate two of the N+2 phase controllers in the redundant path power subsystem 200. The entities and the interfaces between the entities in the redundant path power subsystem 200 are similar to the entities and the interfaces between the entities in the redundant path power subsystem 100 in FIG. 1. For the purpose of simplification, a third phase controller (similar to the phase controller 112 in FIG. 1) and a third phase regulator (similar to the phase regulator 116 in FIG. 1) are not depicted in the redundant path power subsystem 200 of FIG. 2. Also, for the purpose of simplification, details about the entities of the redundant path power subsystem 200 are not described.

FIG. 2 depicts a failure at the phase controller 211. FIG. 2 depicts operations in the redundant path power subsystem 200 to handle the failure at the phase controller 211 in a sequence of stages A through D. The entities in the redundant path power subsystem 200 perform similar operations (as in an event of failure at the phase controller 211) in an event of a failure at one or more of the N+2 phase controllers.

At stage A, a failure occurs at the phase controller 211. For example, one or more of the electronic circuits in the phase controller 211 ceases to function. The failure at phase controller 211 may be a result of power fluctuations, normal wear and tear of electronic components, overheating of electronic components, etc. The phase controller 211 stops sending control signals to the phase regulator 215. In some embodiments, the phase controller 211 sends a signal to the phase regulator 215 to indicate a fault. In some embodiments, the phase regulator 215 detects a failure at the phase controller 211 upon not receiving the expected control signals. In some embodiments, the phase regulator 215 detects a failure at the phase controller 211 on receiving control signals that indicate out-of-bounds values (e.g., current values outside a certain range).

At stage B, the phase regulator 215 is not utilized when a failure occurs at the phase controller 211. The phase regulator 215 ceases to function on not receiving the control signals from the phase controller 211. The phase regulator 215 does not deliver any output current and the total current at the output of the array of N+2 phase regulators is reduced. A reduction in the current at the output of the array of N+2 phase controllers results in dropping of the voltage at the output of N+2 phase controllers.

At stage C, the power supplies 203 and 207 detect failure of the phase controller 211 The power supplies 203 and 207 detect the failure of the phase controller 211 based on diagnostics data returned over the bi-directional I2C bus. For example, the power supplies 203 and 207 determine that a failure occurred at the phase controller 211 when the diagnostics data is out-of-bounds (e.g., large current values, high temperature, etc.). The power supplies 203 and 207 keep track of the active phase controllers and the active phase regulators in the system at any given time to monitor system performance. The redundant path power subsystem 200 includes N+2 phase controllers. When a phase controller fails, the remaining N+1 phase controllers are available in the redundant path power subsystem 200. A system administrator can ignore the first failure without replacing the phase controller 211. The diagnostics data allows the redundant path power subsystem 200 to keep track of failures and the system administrator can replace a failed phase controller when the second phase controller fails. The redundant path power subsystem 200 supports fail-in-place redundancy (i.e., on failure of a phase controller another phase controller is in place). With fail-in-place redundancy, the redundant path power subsystem 200 allows power delivery devices to be placed closed to the load and reduces distribution power losses. Embodiments can utilize a greater number of phase regulators and phase controllers (e.g., N+3, N+4, etc.) to increase redundancy and reduce the probability of a call for replacement of a failed phase controller.

At stage D, the remaining N+1 phase controllers increase the output current delivered by N+1 phase regulators. The remaining N+1 phase controllers receive the same PVID values. The remaining N+1 phase controllers implement Droop current sharing technique and automatically increase the output current delivered by N+1 phase regulators.

Figure 3:
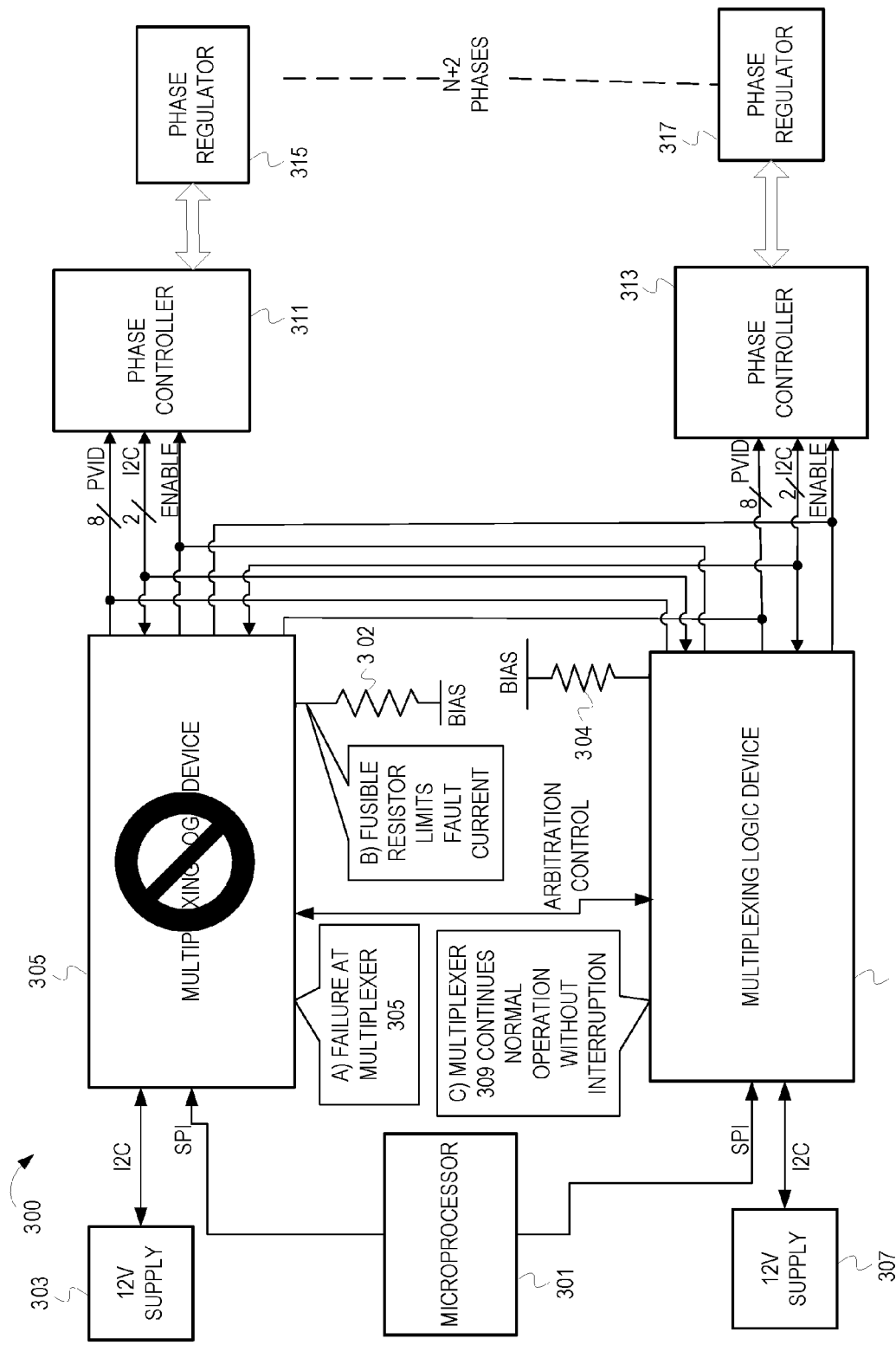
FIG. 3 depicts an example concept diagram of selected components of a redundant path power subsystem with a failure at one of the multiplexing logic devices.

FIG. 3 depicts an example concept diagram of selected components of a redundant path power subsystem with a failure at one of the multiplexing logic devices. FIG. 3 depicts a redundant path power subsystem 300 including a power supply 303, a power supply 307, a microprocessor 301, a multiplexing logic device 305, a fusible resistor 302, a multiplexing logic device 309, a fusible resistor 304, a phase controller 311, a phase regulator 315, a phase controller 313 and a phase regulator 317. The redundant path power subsystem 300 includes an array of N+2 phase regulators. With one phase controller for each phase regulator, the redundant path power subsystem 300 includes N+2 phase controllers. The phase regulator 315 and the phase regulator 317 illustrate two of the N+2 phase regulators in the redundant path power subsystem 300. The phase controller 311 and the phase controller 313 illustrate two of the N+2 phase controllers in the redundant path power subsystem 300. The entities and the interfaces between the entities in the redundant path power subsystem 300 are similar to the entities and the interfaces between the entities in the redundant path power subsystem 100 in FIG. 1. For the purpose of simplification, a third phase controller (similar to the phase controller 112 in FIG. 1) and a third phase regulator (similar to the phase regulator 116 in FIG. 1) are not depicted in the redundant path power subsystem 300 of FIG. 3. Also, for the purpose of simplification, details about the entities of the redundant path power subsystem 300 are not described.

FIG. 3 depicts a failure at the multiplexing logic device 305. FIG. 3 depicts operations in the redundant path power subsystem 300 that handle the failure at the multiplexing logic device 305 in a sequence of stages A through C. The entities in the redundant path power subsystem 300 would perform similar operations in an event of a failure at the multiplexing logic device 309.

At stage A, a failure occurs at the multiplexing logic device 305. For example, one or more of the electronic circuits in the multiplexing logic device 305 ceases to function. The failure at the multiplexing logic device 305 may be a result of power fluctuations, normal wear and tear of electronic components, overheating of electronic components, etc. The failure at the multiplexing logic device 305 results in unsuccessful transmission of control signals for one or more phase controllers. In some embodiments, the power supply 303 detects the failure at the multiplexing logic device 305 from the diagnostics data received over a bi-directional I2C bus. The power supply 303 sends control signals to disable the operations of the multiplexing logic device 305 in an event of failure. In other embodiments, an arbitration control between the multiplexing logic devices 305 and 309 ensures that control signals are only transmitted via the multiplexing logic device 309 and no control signals are transmitted via the multiplexing logic device 305 to any of the N+2 phase controllers.

At stage B, the fusible resistor 302 limits a fault current. For example, when a failure occurs due to excessive amount of current in the multiplexing logic device 305, the fusible resistor 302 melts to limit the fault current. The fusible resistor 302 also ensures that the common supply voltage for the multiplexing logic devices 305 and 309 continues to deliver power normally to the multiplexing logic device 309. The output pins of the multiplexing logic device 305 default to a high-impedance state and in an event of failure, the operations of the multiplexing logic device 309 are not affected.

At stage C, the multiplexing logic device 309 continues normal operations without interruption. All the control signals from the microprocessor 301 and the power supply 307 are transmitted to the N+2 phase controllers via the multiplexing logic device 309. In some embodiments, the multiplexing logic devices 305 and 309 are configured such that in an event of simultaneous failure at both the multiplexing logic devices, control signals are still transmitted to the phase controllers. For example, the multiplexing logic devices 305 and 309 are only utilized for multiplexing an enable signal of each of the N+2 phase controllers and a bi-directional I2C bus of each of the N+2 phase controllers while voltage control signals of each of the N+2 phase controllers are pre-configured. In an event of simultaneous failure at the multiplexing logic devices 305 and 309, the N+2 phase controllers and the N+2 phase regulators continue their respective operations. The N+2 phase regulators continue to deliver current in a pre-determined time sequence. However, the microprocessor 301 cannot be used to establish dynamic voltage control.

A redundant path power subsystem overcomes any single points of failure in a high availability power system with the power conversion modules located close to the output load. Although not depicted in the figures, the redundant path power subsystem is not limited to utilizing N+2 phase controllers and N+2 phase regulators where N phases are sufficient to satisfy the load. A greater number of phase controllers and phase regulators can be utilized to increase redundancy, handle multiple failures and reduce failure rates. The redundant path power subsystem is also not limited to using 2 power supplies and 2 multiplexing logic devices. Greater number of power supplies and multiplexing logic devices can be utilized to establish multiple redundant paths to phase controllers and reduce failure rates.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
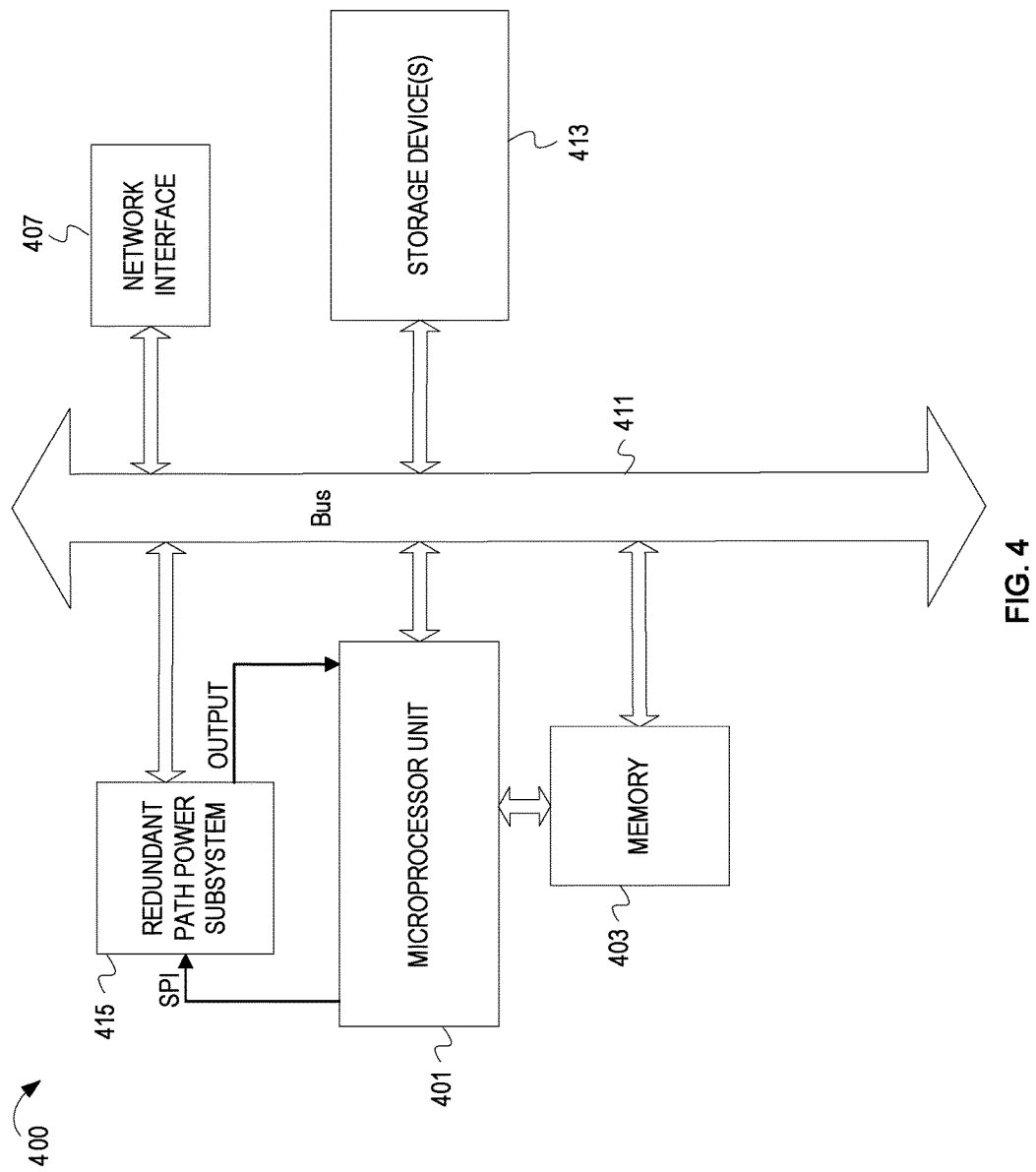
FIG. 4 depicts an example computer system.

FIG. 4 depicts an example computer system. A computer system includes a microprocessor unit 401 (possibly including multiple microprocessors, multiple cores, multiple nodes, and/or implementing multi-threading, etc.). The computer system includes memory 403. The memory 403 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 411 (e.g., PCI, ISA, PCI-Express, HyperTransport® bus, InfiniBand® bus, NuBus bus, etc.), a network interface 407 (e.g., an ATM interface, an Ethernet interface, a Frame Relay interface, SONET interface, wireless interface, etc.), a redundant path power subsystem 415, and a storage device(s) 413 (e.g., optical storage, magnetic storage, etc.). The redundant path power subsystem 415 is embodied in motherboard of the computer system 400. The redundant path power subsystem 415 is interfaced with one or more microprocessors in the microprocessor unit 401 via a SPI bus. The redundant path power subsystem 415 delivers power to the microprocessor unit 401 via an output interface. Although not depicted in FIG. 4, the redundant path power subsystem 415 is also connected to one or more 12V power supplies. The redundant path power subsystem 415 is a component of a microprocessor power management subsystem for the microprocessor unit 401. Any one of these functionalities may be partially (or entirely) implemented in hardware and/or on the microprocessor unit 401. For example, the functionality may be implemented with an application specific integrated circuit, in logic implemented in the microprocessor unit 401, etc. Further, realizations may include fewer or additional components not illustrated in FIG. 4 (e.g., video cards, audio cards, additional network interfaces, peripheral devices, etc.). The microprocessor unit 401, the storage device(s) 413, the redundant path power subsystem 415 and the network interface 407 are coupled to the bus 411. Although illustrated as being coupled to the bus 411, the memory 403 may be coupled to the microprocessor unit 401.

While the embodiments are described with reference to various implementations and exploitations, it will be understood that these embodiments are illustrative and that the scope of the inventive subject matter is not limited to them. For instance, a redundant path power subsystem is not limited to one phase controller per phase. Embodiments can have a n:n relationship between phase controllers and phase regulators controlled by the phase controllers. Also, embodiments are not limited to using a fusible resistor as described herein. Embodiments can use a different current limiting device (e.g., an activity circuit based current limiter). In general, techniques for a multi-phase redundant path power subsystem as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:
1. A redundant path power apparatus comprising:
a plurality of phase regulators in a multi-phase power converter, wherein the plurality of phase regulators comprise at least N+2 phase regulators and wherein N phases are sufficient to serve an electrical load coupled with the redundant path power apparatus;
a plurality of phase controllers configured to control the plurality of phase regulators;
a plurality of multiplexing logic devices coupled to the plurality of phase controllers;

a plurality buses for communicably coupling the multiplexing logic devices to a plurality of power supplies; and a plurality of input and control paths, the plurality of input and control paths including the plurality of multiplexing logic devices and the plurality of phase controllers;

wherein the plurality of multiplexing logic devices are configured to multiplex control signals received from one or more of the plurality of buses.

2. The redundant path power apparatus of claim 1, wherein the plurality of phase controllers comprise a plurality of voltage regulator modules (VRMs).

3. The redundant path power apparatus of claim 2, wherein the plurality of buses include a bi-directional Inter-Integrated Circuit bus.

4. The redundant path power apparatus of claim 1, wherein the plurality of power supplies are configured to detect a failure in any one of the plurality of multiplexing logic devices, the plurality of phase controllers, and the plurality of phase controllers.

5. The redundant path power apparatus of claim 1, wherein the plurality of power supplies are configured to track failures of the phase controllers.

6. The redundant path power apparatus of claim 1, wherein the plurality of power supplies are configured to disable a failed multiplexing logic device of the plurality of multiplexing logic devices in response to detection of failure of the failed multiplexing logic device.

7. The redundant path power apparatus of claim 1, wherein the plurality of phase controllers and the plurality of phase regulators increase current output to accommodate a failed phase regulator or failed phase controller in accordance with a current sharing method in response to detection of the failed phase regulator or failed phase controller.

8. The redundant path power apparatus of claim 1, further comprising an arbitration control between the plurality of multiplexing logic devices, the arbitration control configured to disable a failed one of the plurality of multiplexing logic devices.

9. The redundant path power apparatus of claim 1, wherein each of the plurality of multiplexing logic devices comprises a fusible resistor that limits a fault current.

10. The redundant path power apparatus of claim 1, wherein the plurality of buses further couple a microprocessor to each of the plurality of multiplexing logic devices.

11. The redundant path power apparatus of claim 1, wherein the plurality of phase controllers are configured to continue operating after failure of all of the plurality of multiplexing logic devices without signals from the plurality of multiplexing logic devices or the plurality of power supplies.

12. The redundant path power apparatus of claim 1, wherein the plurality of phase controllers are configured to continue controlling the plurality of phase regulators based on one of a predetermined indication of voltage and an indication of voltage last communicated from a microprocessor.

13. A method of operating a redundant path power subsystem serving an electrical load, the method comprising:

sending control signals from one or more of a plurality of power supplies through one of a plurality of multiplexing logic devices to a plurality of phase controllers, the plurality of phase controllers controlling a plurality of phase regulators in accordance with the control signals;

detecting a failure in any one of the plurality of multiplexing logic devices and the plurality of phase controllers;

adjusting, by active ones of the plurality of phase controllers, output of corresponding ones of the plurality of phase regulators to accommodate the failure and continue serving the electrical load if the failure is in one of the plurality of phase controllers or in one of the plurality of phase regulators; and disabling one of the plurality of multiplexing logic devices if the failure is in the one of the plurality of multiplexing logic devices.

14. The method of claim 13 further comprising the plurality of phase controllers continuing to control output to the electrical load from the plurality of phase regulators in accordance with a predetermined voltage indication if all of the plurality of multiplexing logic devices fail.

15. The method of claim 13, further comprising tracking failures of the phase controllers.

16. The method of claim 13, wherein adjusting, by active ones of the plurality of phase controllers, output of corresponding ones of the plurality of phase regulators comprises increasing current output from corresponding ones of the plurality of phase regulators.

17. The method of claim 16, wherein increasing the current output from corresponding ones of the plurality of phase regulators comprises increasing the current output in accordance with the Droop current sharing method.

* * * * *